United States Patent [19]
Kanakura

[11] Patent Number: 5,197,414
[45] Date of Patent: Mar. 30, 1993

[54] ANIMAL PROTECTIVE COLLAR

[76] Inventor: Yuhko Kanakura, 21-14, 3-chome, Yamafutatsu, Niigata-shi 951, Japan

[21] Appl. No.: 869,492

[22] Filed: Apr. 16, 1992

[30] Foreign Application Priority Data

Jul. 29, 1991 [JP] Japan .............................. 3-87627[U]

[51] Int. Cl.$^5$ ............................................. A01K 27/00
[52] U.S. Cl. ................................................ 119/106
[58] Field of Search ................................. 119/96, 106

[56] References Cited

U.S. PATENT DOCUMENTS

| | | | |
|---|---|---|---|
| 2,956,542 | 10/1960 | Mueller | 119/106 |
| 3,036,554 | 5/1962 | Johnson | 119/106 |
| 3,072,098 | 1/1963 | Boemle | 119/106 |
| 3,153,399 | 10/1964 | Koon | 119/96 |
| 3,387,588 | 6/1968 | Bird | 119/106 |
| 4,200,057 | 4/1980 | Agar | 119/96 X |
| 5,012,764 | 5/1991 | Fick et al. | 119/106 |

*Primary Examiner*—Gene Mancene
*Assistant Examiner*—Thomas Price
*Attorney, Agent, or Firm*—Eckert Seamans Cherin & Mellott

[57] ABSTRACT

An animal protective collar is made of an open work or reticulated material whereby water cannot pool inside the collar when the collar is formed into a truncated cone or funnel and fitted on the neck of an animal such as a dog or cat. Preferably the reticulated material is held in the cone shape via complementary male and female hook fasteners positioned concentrically for selectively sizing the collar. The protective collar, which can be stainless steel or synthetic resin, is useful for protecting a groomer from being bitten during shampooing and the like, and alternatively can pervent the animal from licking a wound on its body or scratching a wound on its head, but providing good ventilation. The body of the collar preferably is formed of a net material with peripheral and radial reinforcement ribs. A grip is attached to project from the outer peripheral rim of the collar, enabling gentle but secure manual control of the animal during shower operations and the like.

9 Claims, 1 Drawing Sheet

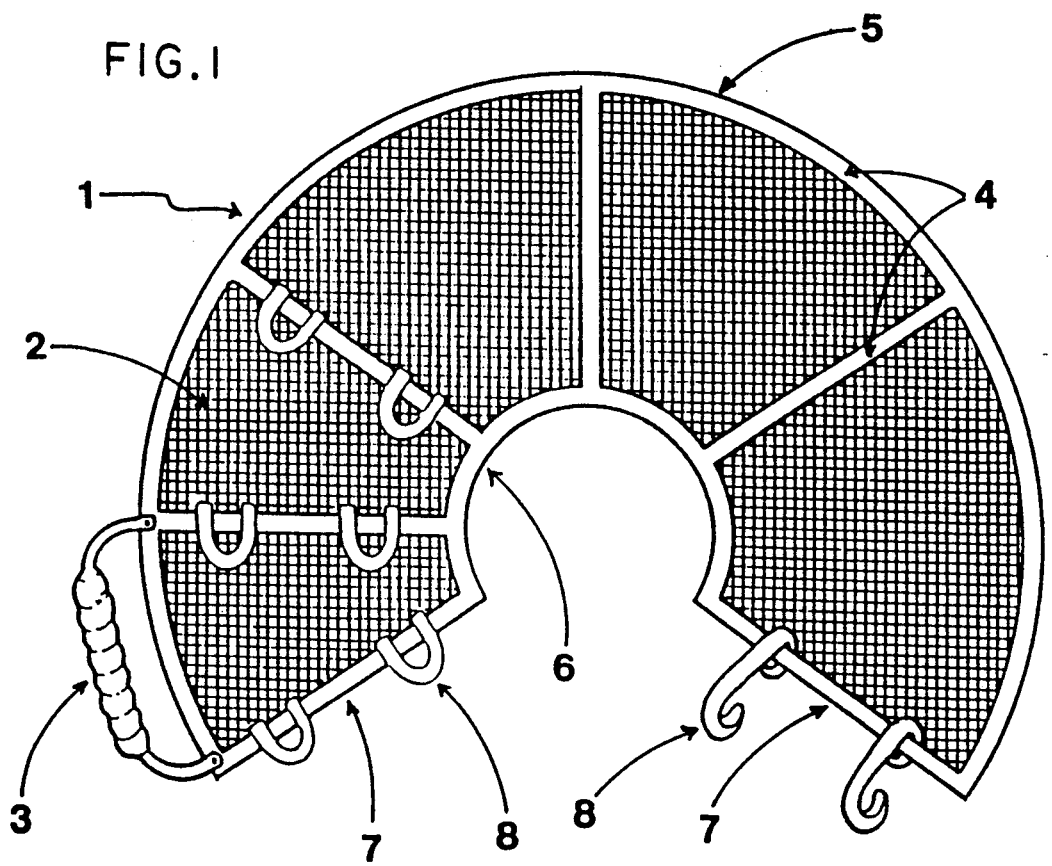
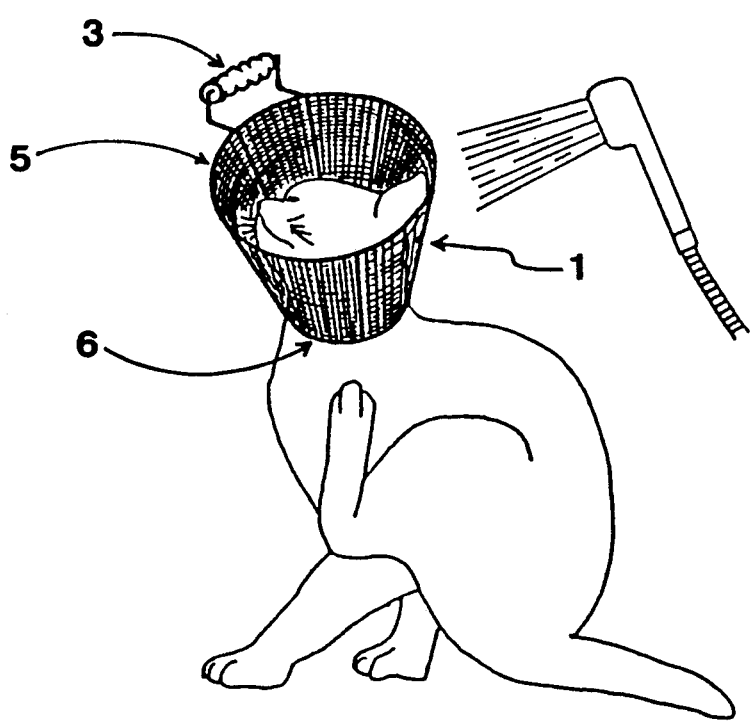

ANIMAL PROTECTIVE COLLAR

BACKGROUND OF THE INVENTION

1. Field of the Invention

The present invention relates to a net collar for pet animals. The collar is adapted to be used for shampooing or diagnosing a pet animal such as a cat, dog or the like.

2. Description of Related Art

A disc-shaped collar, known as the Elizabethan collar or animal necker, is known for use in a veterinary surgeon's hospital for preventing an animal such as a dog, cat or the like from biting or licking a wound, e.g., licking medicine applied to the animal. As disclosed, for example, in Japanese Utility Model Publication No. 40553-1973; Japanese Utility Model Application Laid-Open No. 117088-1975; or Japanese Utility Model Application Laid-Open No. 13217-1983, the collar is a doughnut-shaped disc made of synthetic resin to be fitted on the neck of an animal. The outer peripheral edge of the disc, which has a diameter larger than the animal's reach, blocks the animal from biting or licking its body.

Recently, this kind of collar has been used as a shampoo tool. Formerly, in pet grooming shops the face of a dog or a cat would be covered with a mask, or its jaws would be restricted by a cord, as a means to prevent workers from being bitten. Some such provision to prevent biting is advantageous for enhancing working efficiency and, of course, to prevent accidental injury. However, it has been found that the above-mentioned collars are better than masks or cords. Such a collar can be fitted to any kind or size of animal such as a cat, dog or the like, and closed using locking means such as a button, hook, tape or the like. The collar is very simple in its structure, is easily fitted, and is less discomforting for the animal than a cord or mask.

Such an article is commercially available for medical treatment or shampooing. The article is formed of a sector cut out in part from a disc made of synthetic resin, and can be rolled into the shape of a truncated cone or funnel. This product is similar to a pet shampoo hat (see Japanese Utility Model Publication No. 3401-1982). U.S. Pat. No(s). 5,012,764; 4,476,814; 3,702,098; 3,036,554; and 3,031,530 disclose similar structures.

When the above-mentioned conventional synthetic resin collar is rolled into a funnel shape and fitted onto the neck of a dog or cat for shampooing, the funnel forms a receptacle that accumulates water. For example, when rinsing away detergent with a shower, hot shower water running into the top opening of the funnel shaped collar pools in the collar. Accordingly, the animal may ingest the water and not infrequently may choke violently and/or painfully.

The tendency of water to pool in the collar can be avoided by setting the collar only loosely around the neck of the animal so that the water can drain away between the collar and the animal's neck. However, in that case the collar is not attached sufficiently securely to hold the animal. As a result there is a danger that a worker may be bitten on the hand because the animal at least is free to move its head about relative to the collar.

Further, the synthetic resin disc is very slippery when wet. A worker who grips the edge of the disc with his fingers sometimes slips and releases the collar when the animal makes a quick move. If the worker releases manual engagement of the collar, the danger of being bitten by the animal is increased. Accordingly, a second worker for holding the animal is inevitably required.

SUMMARY OF THE INVENTION

The present invention is intended to eliminate the above-mentioned problems inherent in conventional collars.

One object of the invention is to provide a funnel shaped collar incorporating a novel means which can prevent hot shower water from being pooled in the collar while also engaging the animal securely enough to prevent the hand of a worker gripping the collar from being bitten by the animal wearing the collar on its neck.

To the end, an open work collar for showering and shampooing pet animals according to the invention has a reticulated body of net-like material. The body generally defines a doughnut-shaped disc when flattened, having an inner and outer peripheral edge. Locking means such as concentric rows of male and female hooks are incorporated to the doughnut-shaped disc for holding the body in a truncated cone shape at a selected diameter. A grip of a suitable shape is attached to the outer peripheral edge of the body, preferably removably.

Since the body is formed of a net-like reticulated material, water can readily drain from the collar. The collar is also well ventilated. Accordingly, water poured onto the animal's head drains through the net-like members, and cannot pool in the rolled funnel-like body. Further, since it is well ventilated, a hair dryer can be readily used while the collar remains in place.

The grip projects outwardly from the outer peripheral edge of the body, whereby the body can be held more firmly for controlling the animal. The grip can be held safely by the worker's full hand, and not merely by the fingertips, manipulating the animal while avoiding injury. Even if the animal stretches its head relative to the collar in an attempt to bite the worker's hand, its mouth cannot reach the grip, and accordingly, the groomer's hand cannot be bitten by the animal.

BRIEF DESCRIPTION OF THE DRAWINGS

These and other features and advantages of the invention will be more apparent from the preferred embodiment of the invention which is discussed with reference to the accompanying drawings, in which:

FIG. 1 is a plan view illustrating an embodiment of the present invention; and

FIG. 2 is a perspective view illustrating an operational condition of the arrangement shown in FIG. 1.

DETAILED DESCRIPTION OF THE PREFERRED EMBODIMENTS

FIG. 1 is a plan view illustrating an embodiment of the invention, and FIG. 2 is a perspective view illustrating use of the arrangement shown in FIG. 1. A body 1 which is essentially doughnut-shaped, is defined by a U-shaped sector, e.g., cut from a circular doughnut shape. The body 1 also may be semicircular. The body 1 is long enough along length 7 to prevent any part of the animal's mouth from protruding beyond the outer peripheral edge 5 of the body 1 when the collar is in place. Even if the animal stretches its head, it cannot reach past the peripheral edge 5.

Reticulated or net-like members 2 constituting the body 1 are preferably made of metal such as stainless steel or the like, flexible synthetic resin or the like. The particular material and mesh size can be varied in view of the type of animal to allow drainage while confining the animal against biting. In this embodiment, the outer and inner peripheral edges, and both ends 7, 7 of the body 1 are reinforced by support members 4. The body 1 is also reinforced by intermediate radially disposed support members 4, e.g., at different positions and having associated fasteners. The fasteners are arranged concentrically for providing alternative points of attachment, thereby selecting the internal dimension of the truncated cone or funnel to fit the animal's neck. The support members 4 may be made of the same material as that of the net-like members 2.

A grip 3, which has an arbitrary shape, projects from the outer peripheral edge 5 of the body 1 at a suitable position for grasping. In this embodiment, the support member 4 at one of the ends 7 supports an L-shaped grip 3. The grip 3 can be removably attached to the body 1 with the use of a suitable attaching means.

Only one grip 3 is shown in the drawings. Two grips 3 may be provided, for example where it is essential to hold the body 1 with both hands, e.g., if a large dog is to be handled. The angle between the grip 3 and the body may be suitably selected, and accordingly, it may be obliquely or perpendicularly attached to the body 1. Further, the grip 3 and one of the net-like members may be integrally incorporated with each other, e.g., formed in the same material. A net-like member with no grip attached thereto is also possible according to the invention.

As shown in FIG. 1, paired male and female locking means 8, 8 are attached respectively to the ends 7, 7 of the body 1. The locking means need not be limited to a specific pair or a specific type. Buttons, adhesive tapes, surface fasteners or the like may be used as the locking means instead of hooks as shown in FIG. 1.

In using the net-like pet collar according to the invention, which drains freely, shower water does not pool in the collar surrounding the neck of an animal because the body is net-like. Accordingly, it is possible to avoid water from being accidentally ingested. Further, since a stream of hot water jetted on the net-like member from a shower or the like is damped by the net-like members, an unexpected advantage is obtained. An animal who might react violently to having its face splashed with hot water directly, becomes relatively mild and gentle. In case shower water is poured onto the animal's head, the volume of water is advantageously decreased in comparison with that used when washing the body of the animal, thus paying attention so as not to surprise or unduly aggravate the animal. However, the net-like pet collar of the invention enables sufficient control of the animal that detergent can be rinsed from the head and the face of the animal by a full volume shower as well. Accordingly, it is not necessary to stop frequently to adjust the volume of shower, which is troublesome.

Further with a conventional synthetic resin collar, the splash-back of shower water from the surface of the collar has been strong, for example splashing in the face of the groomer or the like. The net-like collar according to the present invention effectively prevents splashing, and shampoo work can be performed more comfortably. Further, when the animal is to be dried by a hair dryer, the head and the body of the animal would need separate attention using a collar which is not well ventilated. With the net-like pet collar according to the invention, the dryer can be used continuously along the body from the head to the tail. Moreover, drying proceeds quickly since the net-like pet collar is well ventilated. Further, the animal's head and face can be observed through the net-like members. Accordingly, it is possible to be gentle while avoiding the danger that the worker's ear or eye may be abruptly attacked by the animal when in range, e.g. when the dryer or shower unit is shifted from the body of the animal to its head.

In addition to the foregoing advantages accruing due to the net-like character of the pet collar, the grip also provides remarkable technical effects and advantages. In a pet grooming shop it is normally necessary to carefully wash the entire body of the animal, including its head, using a detergent; rinsing the animal's fur, and thus washing the detergent away from the animal with the use of a shower; and drying the animal. This work must be carried out even if the cat or dog does not like shampoo and cries or acts violently. It has been laborious to control or hold an animal, and animals which hardly can be handled due to their resistance have even required administration of an anesthetic, even though injection or other administration of an anesthetic is also dangerous.

By use of the grip 3, the net-like pet collar, and the pet itself, can be manipulated using only one hand. Conventional problems such as the danger of biting the worker's hand are eliminated, and furthermore, unexpected remarkable additional benefits are achieved. For example, an animal can be easily controlled, back and forth, and left and right, by gripping the grip of the net-like pet collar fitted on the neck of the animal, which is remarkably easier than otherwise controlling the animal. For example, if a cat attempts to spring at a groomer who holds the net-like pet collar, the groomer can lift the collar higher so as to suspend the cat safely. Alternatively the groomer may choose to press the collar downwardly to hold the cat. As another example, a dog who edges backward to escape the groomer can be drawn near. Even if a dog acts violently, e.g., shaking its head, the dog can be made to be manipulated gently and quickly, e.g., by holding the net-like pet collar with both hands. Work which would have required three workers can be accomplished by two workers, and work which required two workers can be accomplished by one. Working efficiency is remarkably enhanced.

Efficiency improves because the grip is not merely a holder for a static load such as a pan or the like. The grip according to the invention provides an excellent function in controlling the animal and is thus comparable to the function of the steering wheel of an automobile or the like. Furthermore, the net-like pet collar incorporating the grip is ideal under the circumstances since it is much more gentle to the animal than a conventional binding unit such as a mask, muzzle, drawstring for the jaws, fastening collar, restraint or the like.

The net-like pet collar incorporating the grip can serve as a holder with excellent results even in the field of veterinary surgery. Conventionally, in the case of a medical treatment without anesthesia, the animal has been fastened with the use of a mask or a rope with an attendant such as the owner of the animal holding its head. The net-like pet collar of the invention which can be fitted such that any person can hold the animal surely, and without injury. If the collar is fitted to an animal in order to prevent the animal from touching a wound on its face with its paw or foot, the well-ventilated nature of the net-like pet collar promotes curing of the wound. Similarly, if an animal who undergoes surgery in the summer time is located outdoors, there has been such a serious disadvantage that the conventional disc-like shape collar is very hot, serving as a reflector and confining solar heat to the animal's head. In contrast, the net-like pet collar does not substantially reflect or trap heat, and accordingly it is possible to avoid weakening the convalescing animal in such a way. Of course, the collar is also effective as a bite preventing tool for use when walking an animal or to be used in conjunction with vaccination. In the event that no grip is required in the particular circumstances, the grip is removably attached to project from the net-like pet collar, and can be used or not as needed.

What is claimed is:

1. An animal collar assembly for shower treatment of an animal, the collar assembly being fittable on a neck of the animal, the collar assembly comprising:
    a body of reticulated material, said body being cut in part to form a truncated cone;
    male and female locking means attached to respective ends of said body for holding the body in a shape of said cone; and,
    a handle provided on said body.

2. The animal collar assembly for shower treatment according to claim 1, wherein said reticulated material extends substantially fully around the truncated cone.

3. The animal collar assembly for shower treatment according to claim 1, wherein the handle is removably attached to the body.

4. The animal collar assembly for shower treatment according to claims 1 or 2, wherein the handle protrudes outwardly of the truncated cone from a peripheral edge of the body.

5. The animal collar assembly for shower treatment according to claims 1 or 2, wherein said reticulated member comprises steel.

6. The animal collar assembly for shower treatment according to claims 1 or 2, wherein said reticulated member comprises a flexible synthetic resin.

7. The animal collar assembly for shower treatment according to claims 1 or 2, further comprising support means extending along outer and inner peripheral edges of the body and along radii of the truncated cone for supporting the reticulated material.

8. The animal collar assembly for shower treatment aczording to claim 1, wherein a plurality of said locking means are concentrically spaced on the body for fixing the body n said truncated cone at a plurality of sizes.

9. The animal collar assembly for shower treatment according to claim 1, wherein said locking means comprise hooks.

* * * * *

UNITED STATES PATENT AND TRADEMARK OFFICE
CERTIFICATE OF CORRECTION

PATENT NO. : 5,197,414
DATED : March 30, 1993
INVENTOR(S) : Yuhko Kanakura

It is certified that error appears in the above-identified patent and that said Letters Patent is hereby corrected as shown below:

On the title page, [57] Abstract:

In line 11 of the Abstract, replace "pervent" with --prevent--.

Column 6:

In Claim 8, line 2, "aczording" should read --according--.

In Claim 8, line 4, "n" should read --in--.

Signed and Sealed this

Thirtieth Day of November, 1993

Attest:

BRUCE LEHMAN

Attesting Officer

Commissioner of Patents and Trademarks